(12) United States Patent
Navarra Pruna

(10) Patent No.: US 6,889,954 B2
(45) Date of Patent: May 10, 2005

(54) UNIVERSAL MARKING INSERT FOR INJECTION MOULDS

(75) Inventor: Alberto Navarra Pruna, Barcelona (ES)

(73) Assignee: Comercial de Utiles y Moldes, S.A., Barcelona (ES)

(*) Notice: Subject to any disclaimer, the term of this patent is extended or adjusted under 35 U.S.C. 154(b) by 121 days.

(21) Appl. No.: 10/385,877

(22) Filed: Mar. 11, 2003

(65) Prior Publication Data

US 2004/0178319 A1 Sep. 16, 2004

(51) Int. Cl.⁷ ............................................... B29C 39/42
(52) U.S. Cl. .................... 249/103; 249/104; 425/192 R
(58) Field of Search ................................ 249/103, 104; 425/190, 192 R, 195

(56) References Cited

U.S. PATENT DOCUMENTS

| | | | | |
|---|---|---|---|---|
| 4,384,702 A | * | 5/1983 | Boskovic | 249/103 |
| 5,620,716 A | * | 4/1997 | Opitz | 425/169 |
| 5,788,872 A | * | 8/1998 | Uratani | 249/103 |
| 5,817,349 A | * | 10/1998 | Pruna | 425/542 |
| 5,853,606 A | * | 12/1998 | Boskovic | 249/103 |
| 6,755,386 B2 | * | 6/2004 | Navarra Pruna | 249/103 |

FOREIGN PATENT DOCUMENTS

| | | |
|---|---|---|
| DE | 0 628 396 B1 | 12/1994 |
| DE | 197 05 187 A1 * | 8/1997 |
| EP | 0 628 396 | 12/1994 |
| JP | 10-44163 A * | 2/1998 |

OTHER PUBLICATIONS

English abstract for DE 197 05 187.*
English abstract for JP 10–44163.*
European Search Report dated Jul. 21, 2003.

* cited by examiner

Primary Examiner—James P. Mackey
Assistant Examiner—Donald Heckenberg
(74) Attorney, Agent, or Firm—Katten Muchin Zavis Rosenman

(57) ABSTRACT

Having a body that forms the marking insert body. This body has a central opening into which the marking case will be inserted and a ring being set out externally on the side to be inserted into the mould, on which different motifs to be transferred to the moulded body, will be engraved.

Internally it has a nut secured by means of a spring to the closing end-cap, the shaft of the marking unit screwing into said nut, the spring staying in tension while in use, and retaining the marking insert from a possible withdrawal.

1 Claim, 1 Drawing Sheet

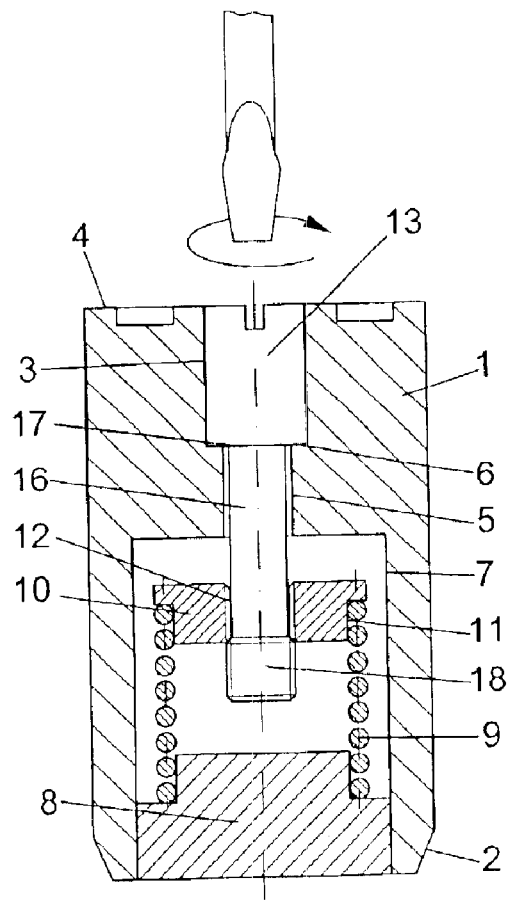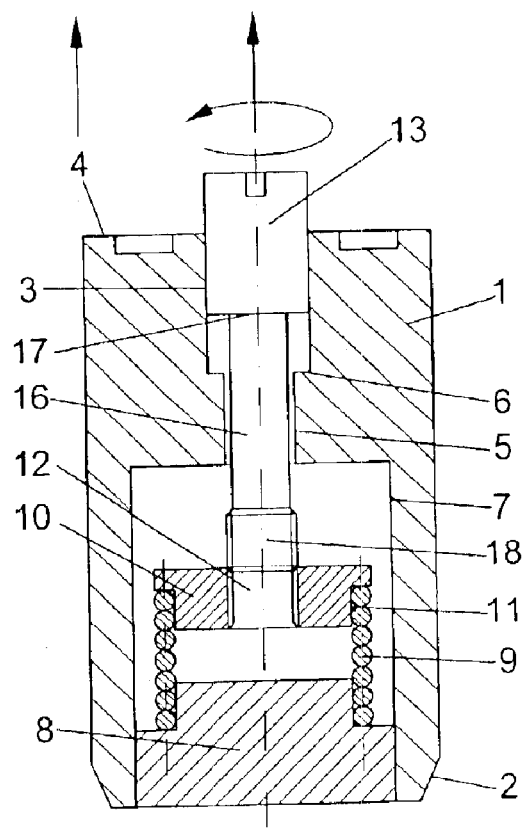
FIG.1  FIG.3
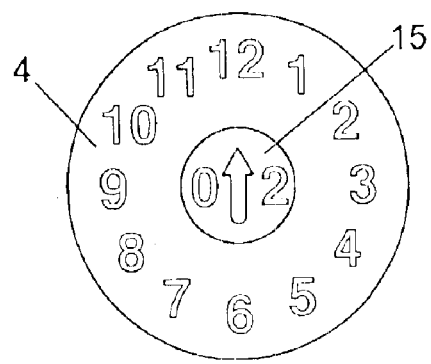
FIG.2

UNIVERSAL MARKING INSERT FOR INJECTION MOULDS

PURPOSE OF THE INVENTION

This invention consists of a universal marking insert adaptable for incorporation into an injection mould, that, due to its morphological characteristics, makes its coupling with any type of injection mould, whatever its dimensions, possible.

BACKGROUND TO THE INVENTION

The European Patent 0 628 396, relating to a "Marking insert for an injection mould" is known, that preferably consists of a housing into which an marking unit, formed by a cylindrical part, is fitted, on the whose surface the part on which it will print is marked, the displacement slot of said marking unit, and on the outer housing the numerals or signs that will be impressed in the mould will be placed. This marking unit is set out along a lengthened shaft, finishing in a threaded unit, that is screwed onto a hexagonally-shaped housing that runs along a cavity, also hexagonal, that is in the housing, with the aim that when this marking unit is screwed onto said hexagonal unit, it prevents its rotation and therefore it achieves perfect securing of both parts.

Between the hexagonal unit and the cylindrical main housing a spring is placed that is compressed as the marking unit is introduced onto the cylindrical housing. This spring is continuously compressed and therefore it is always working in compression in this application.

This device, that has been shown to be effective in operation, has problems in execution in certain sizes, since there are difficulties in manufacture of the hexagonal unit onto which the marking unit is screwed, when the sizes required for said marking unit are very small, that is, significant limitations exist when reducing the size of these marking inserts, since current manufacturing techniques prevent the hexagonal piece from being made in relatively small dimensions, due to the difficulty of making that hexagonal unit in such small dimensions.

Trying to avert this problem, the holder of the present invention has tried to achieve a marking insert device that is an improvement on the situation of the current technique, that is, on the European Patent 0 623 396, and that allows said marking insert to be adapted to any mould size, even allowing a marking insert of very small or reduced dimensions.

DESCRIPTION OF THE INVENTION

The present invention has been developed to solve the aforementioned problem of the difficulty of making marking inserts of very small size, for which the part that is difficult to make, that is the hexagonal unit, because of the difficulty of machining in small sizes, has been suppressed.

To achieve the object of this invention the operating philosophy of the device has been modified, since the spring provided for the purpose works in traction in the patent instead of in compression as it did previously. With this operating philosophy, some pieces of very reduced size have been achieved, that are not difficult to manufacture, as was the existing hexagonal unit referred to in the European Patent EP 0 628 396.

The present invention has a body that forms the marking insert body, preferably formed of a body of cylindrical external profile, that at its end is conically tapered to allow its insertion into the injection mould.

This marking insert unit has a central opening into which the marking unit will be inserted, and a ring set out externally on the side to be inserted into the mould, on which different motifs that it is wished to transfer to the moulded body, as can be, for example, the numbers of the months, identification letters, etc., will be engraved.

This central opening of the marking insert unit has a first reduction followed by a second opening connected to this, that creates a support ring on which the marking unit, that is formed of a stepped and lengthened body, will remain secured. This central opening has a cylindrically-shaped rear reduction with a large sized perimeter, into which an external closing cap will be placed on the opposite side to that of the marking area of the mould piece; this cap could be screwed or attached at pressure. This cap will have a spring joined to it, and similarly joined to the other end of the spring it will have a nut that will be attached directly and externally to the spring, this nut having a threaded central hole, through which the shaft of the marking unit is inserted.

This marking unit is formed by a lengthened unit of different diameters, the first of them formed by the head and that will have an indicating, signaller or facilitator of the manual movement of this insert engraved, that continues into a smaller diameter and lengthened body that at its end has a threaded area that will be inserted into the internal nut.

The manner of proceeding with the mounting of this unit consists in the introduction of the marking unit part and by its screwed rotation, the threaded area will insert itself into the internal nut, whose relative movement is prevented through the action of the spring. This marking unit, as it is rotated, is screwed into the actual nut and therefore the spring is continually stretched, being made to work in traction. The critical moment is that in which the nut finally surpasses the area of threaded body of the marking unit insert.

The critical condition occurs when the threaded body of the marking unit has been fully inserted into the nut provided to this effect and that is attached to the traction spring, because of which, from that moment and as the marking unit continues rotating, the unit, as it is dragged, passes the threaded part of the nut and therefore the spring incorporated in this assembly no longer continues to be extended further. The securing of the marking unit at this position is automatic due to the withholding force caused by the tension of the spring and the nut that it exerts on this marking unit and therefore prevents its movement, when marking insert is used in the moulding of parts.

For the disassembly of the insert the marking unit will be rotated in an opposite sense and therefore the threaded end would be unscrewed from the nut and then withdrawn.

As has already been said, these parts can be manufactured in a particularly small size, because of which there are no limitations in the manufacture of marking units or inserts of reduced dimensions.

DESCRIPTION OF THE DRAWINGS

To supplement this description and with the aim of leading to a better understanding of the characteristics of the invention, in accordance with a preferred example of its practical embodiment, as an integral part of this description it is accompanied by a set of drawings where in an illustrative and non-limiting way, the following have been represented:

FIG. 1.—Shows a cutaway section view of the invention insert in operating or working position.

FIG. 2.—Shows an overview of the said marking insert, with some whimsical symbols to be marked on the injected body.

FIG. 3.—Shows the marking insert of the invention in a dismantled position or at start of assembly of the said unit, with the traction spring extended.

PREFERRED EMBODIMENT OF THE INVENTION

With FIG. 1, the marking insert can be seen; it consists of a body preferably of cylindrical external shape (1), that at its end has a conical narrowing (2), to facilitate the positioning of said insert. This marking insert has a central opening (3) that defines an upper area (4) that can be seen with greater detail in FIG. 2, in which different signs can be engraved, as can be numbers of months, identification letters or any other type of sign or characteristic feature that it is required to print on the injection body.

This central opening (3), is divided into various sections, having at first a cylindrical area near the face (4) relating to the marking element, that finishes in a in-stepping formed in its junction with the central part (5) that is an opening of smaller diameter. The junction of these two areas, determines a in-stepping (6) that is used to support the marking unit that will be described later. This central opening finishes in its opposite end in a opening (7) of greater dimensions and that will serve as a housing body for the tensing device that will be explained below. This central opening with the three sections in which it is made are cylindrical openings perfectly machinable and producible in minimum dimensions, because of which the limits of manufacture are very small and therefore evidently a marking insert of fairly reduced dimensions can be made.

The opening (7) is complemented at its opposite end with a closing cap (8) which can be sealed by threading or the closing of said cap (8) at pressure, a cap (8) that will serve for the securing and support in it of a spring (9) whose opposite end, that is attached directly on the nut (10), a nut that, on one hand, will provide a support and securing area for the spring (9) that is defined by a surface (11) on which the spring is supported at pressure (9) and prevents rotation with respect to the spring (9) and the nut (10). Said nut (10) has a threaded central hole (12).

The second unit that makes up the invention marking insert consists of the actual marking unit (13) that is basically formed by a unit of different diameter, being formed by an external unit or head of the marking unit (14) that defines a surface (15) that is seen with greater detail in FIG. 2, that has engravings that allow possible movement of this unit with its tool in order to carry out its rotation and engravings that will be transferred to the injected unit at the surface (4) level of the main unit of the insert (1). This marking unit (13) similarly has a tapered area of lesser diameter (16) and between both the in-stepping (17) is formed that will rest on the step (6) that is part of the body (1), forming the limit of penetration of said marking unit on the central body of the marking insert between both in-steppings.

This unit (13), finishes at its end in a upper section threaded area (18) that will be screwed onto the threaded area (12) of the nut (10).

In this FIG. 1, the securing of this marking insert can be seen in operation, in which the marking unit (13) has been inserted totally on the unit (1) and therefore the threaded area (18) has passes the threaded area (12) of the nut, and therefore the spring is working in traction. The only thing that would make possible the rotation of the marking unit (13) would be for the threaded unit (18) to go past on the threaded body (12) of the nut (10) and therefore the aforementioned spring (9) would not extend more.

This marking unit (13) is prevented from leaving its position by the retention caused by the nut (10) and by the force exercised by the spring, that is constantly pressing on the nut (10) and therefore on the marking unit (13) so that it remains bonded to the body (1).

FIG. 3, in which all the references previously indicated for FIG. 1 are valid, allows the introduction of the marking unit (13) into the assembly the initial position before screwing the unit (18) onto the nut (10) being seen, and how the spring (9) is completely extended instead of being in compressed position, as it was in FIG. 1.

What is claimed is:

1. A universal marking insert for injection moulds, the marking insert comprising:

a removable marking unit for marking products in the injection moulds; the marking unit comprising a head, and a threaded body portion, the threaded body portion being smaller in diameter than the head; and a receiving unit for receiving the marking unit; the receiving unit comprising
a hollow base body having a first and a second opening, the first opening being adapted for inserting the removable marking unit into the receiving unit, the hollow base body having a plurality of cavities having central in-stepping that permits passage of the threaded body portion and retains the head,
an end cap disposed in the second opening, and
a tightening element having a spring and a nut and being disposed in one of the plurality of cavities, the nut having a threaded opening for matingly engaging the threaded body portion, the spring being disposed on the end cap to have a tractive force on the nut so as to retain the marking unit.

* * * * *